United States Patent [19]
Bennett

[11] 4,047,011
[45] Sept. 6, 1977

[54] MODULAR APPARATUS FOR BINARY QUOTIENT, BINARY PRODUCT, BINARY SUM AND BINARY DIFFERENCE GENERATION

[75] Inventor: Walter Scott Bennett, Loveland, Colo.

[73] Assignee: Burroughs Corporation, Detroit, Mich.

[21] Appl. No.: 639,517

[22] Filed: Dec. 15, 1975

Related U.S. Application Data

[63] Continuation of Ser. No. 489,884, July 19, 1974, abandoned.

[51] Int. Cl.² .............................................. G06F 7/52
[52] U.S. Cl. .................................................... 235/164
[58] Field of Search ......................................... 235/164

[56] References Cited

U.S. PATENT DOCUMENTS

| | | | |
|---|---|---|---|
| 3,591,787 | 7/1971 | Freiman | 235/164 |
| 3,633,018 | 1/1972 | Ling | 235/164 |
| 3,648,038 | 3/1972 | Sierra | 235/164 |
| 3,752,971 | 8/1973 | Calhoun et al. | 235/164 |
| 3,777,132 | 12/1973 | Bennett | 235/164 |

OTHER PUBLICATIONS

M. J. Flynn, "On Division by Functional Interation" *IEEE Trans. on Computers* vol. C-19 No. 8 pp. 702–706 Aug. '70.

*Primary Examiner*—David H. Malzahn
*Attorney, Agent, or Firm*—Nathan Cass; Kevin R. Peterson; Edward J. Feeney, Jr.

[57] ABSTRACT

Three modular arrays structured from a common module are connected together a first way to form a binary quotient by successive approximations, or a second way to form a binary product. Any one of the three modular arrays may be used to add or subtract two binary numbers. To divide, one array is utilized to generate a shift and add sequence that represents the reciprocal of the divisor, most significant bit first. As this add and shift sequence is being formed, it is, at the same time, being utilized to manipulate the dividend, thereby forming the quotient, most significant bit first. In effect, the dividend is being multiplied by the reciprocal of the divisor so as to form a product of the dividend and reciprocal of the divisor, most significant bit first. This product is actually the quotient of the dividend and divisor. The binary product of two numbers is formed, most significant bit first, by manipulating the multiplicand according to an add and shift sequence determined by use of the multiplier.

21 Claims, 8 Drawing Figures

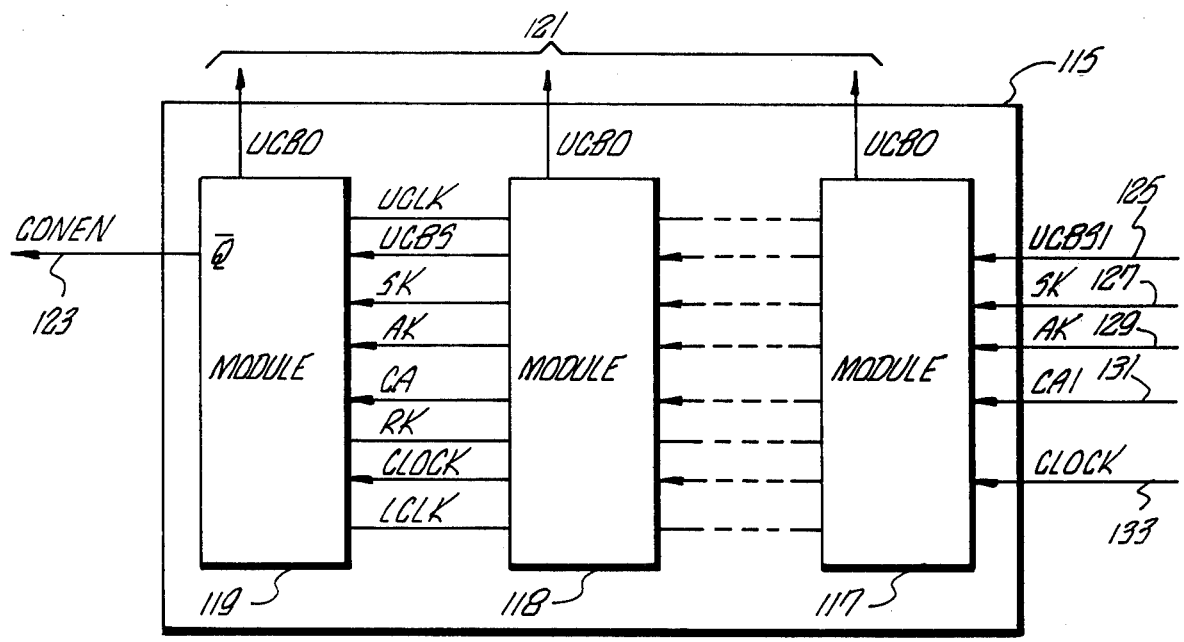
FIG_4_
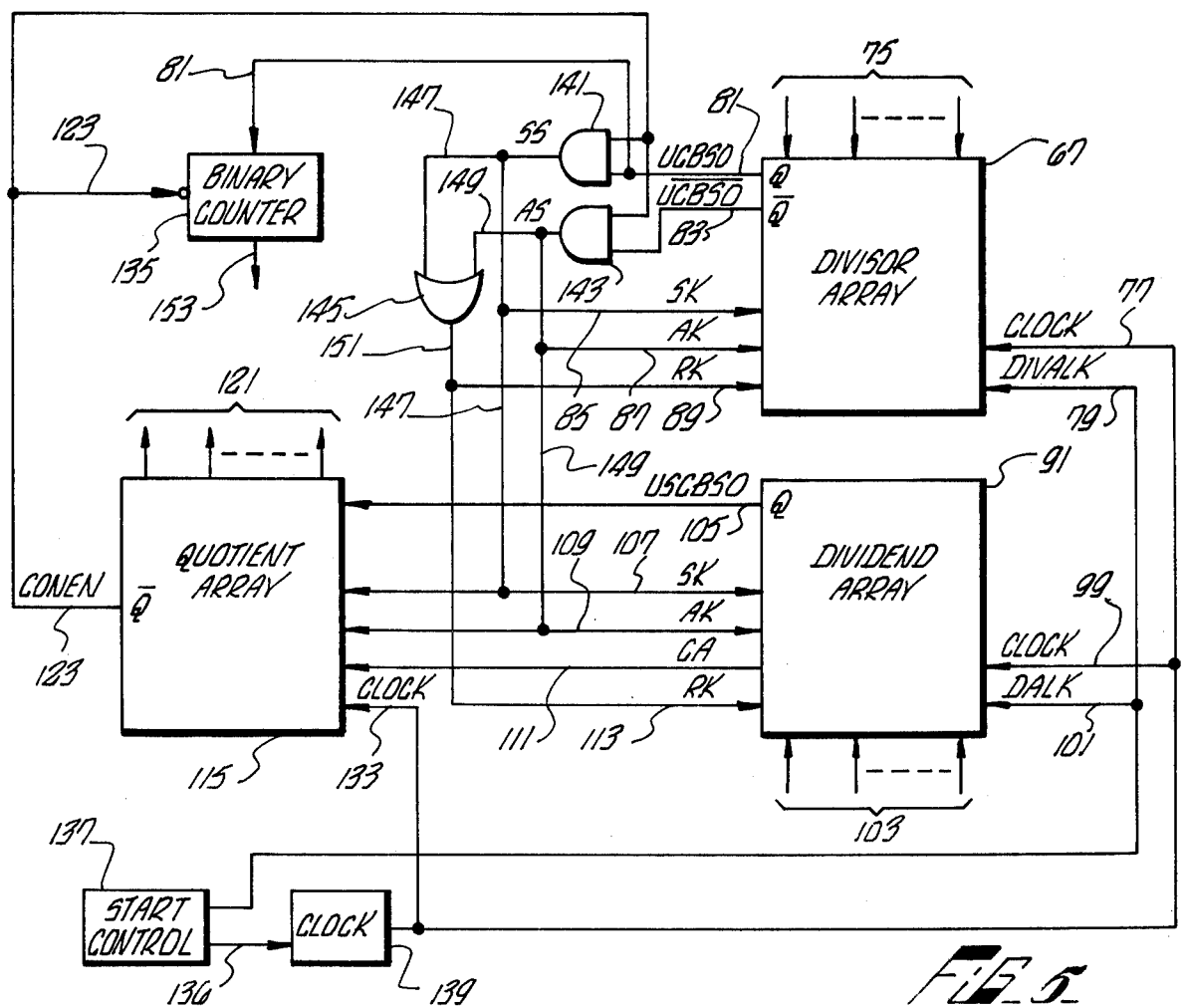
FIG_5_

| STEP | DIVCLK | DALK | SS | AS | RK | CONEN | CLOCK | DIVISOR ARRAY UPPER REGISTER CELLS / LOWER REGISTER CELLS | QUOTIENT ARRAY UPPER REGISTER CELLS | DIVIDEND ARRAY UPPER REGISTER CELLS / LOWER REGISTER CELLS |
|---|---|---|---|---|---|---|---|---|---|---|
|  | 1 | 0 | 0 | 0 | 1 | 1 |  | .000000<br>000000 | .000000 | .000000<br>000000 |
| 1 | 1 | 0 | 1 | 1 | 1 | 1 |  | 010110<br>010110 | 000000 | 100001<br>100001 |
| 2 | 0 | 1 | 0 | 1 | 1 | 1 |  | 101100<br>010110 | 000001 | 000010<br>100001 |
| 3 | 0 | 0 | 1 | 1 | 1 | 1 |  | 011000<br>010110 | 000010 | 000100<br>100001 |
| 4 | 0 | 1 | 0 | 1 | 1 | 1 |  | 101110<br>010110 | 000010 | 100101<br>100001 |
| 5 | 0 | 0 | 1 | 1 | 1 | 1 |  | 011100<br>010110 | 000101 | 001010<br>100001 |
| 6 | 0 | 1 | 0 | 1 | 1 | 1 |  | 110010<br>010110 | 000101 | 101011<br>100001 |
| 7 | 0 | 1 | 0 | 1 | 1 | 1 |  | 100100<br>010110 | 001011 | 010110<br>100001 |
| 8 | 0 | 0 | 1 | 1 | 1 | 1 |  | 001000<br>010110 | 010110 | 101100<br>100001 |
| 9 | 0 | 0 | 1 | 1 | 1 | 1 |  | 011110<br>010110 | 010111 | 001101<br>100001 |
| 10 | 0 | 1 | 0 | 1 | 1 | 1 |  | 110100<br>010110 | 010111 | 101110<br>100001 |
| 11 | 0 | 0 | 0 | 0 | 0 | 1 |  | 101000<br>010110 | 101111 | 011100<br>100001 |
| 12 | 0 | 0 | 0 | 0 | 0 | 1 |  | 000000<br>000000 | 000000 | 000000<br>000000 |

FIG_6

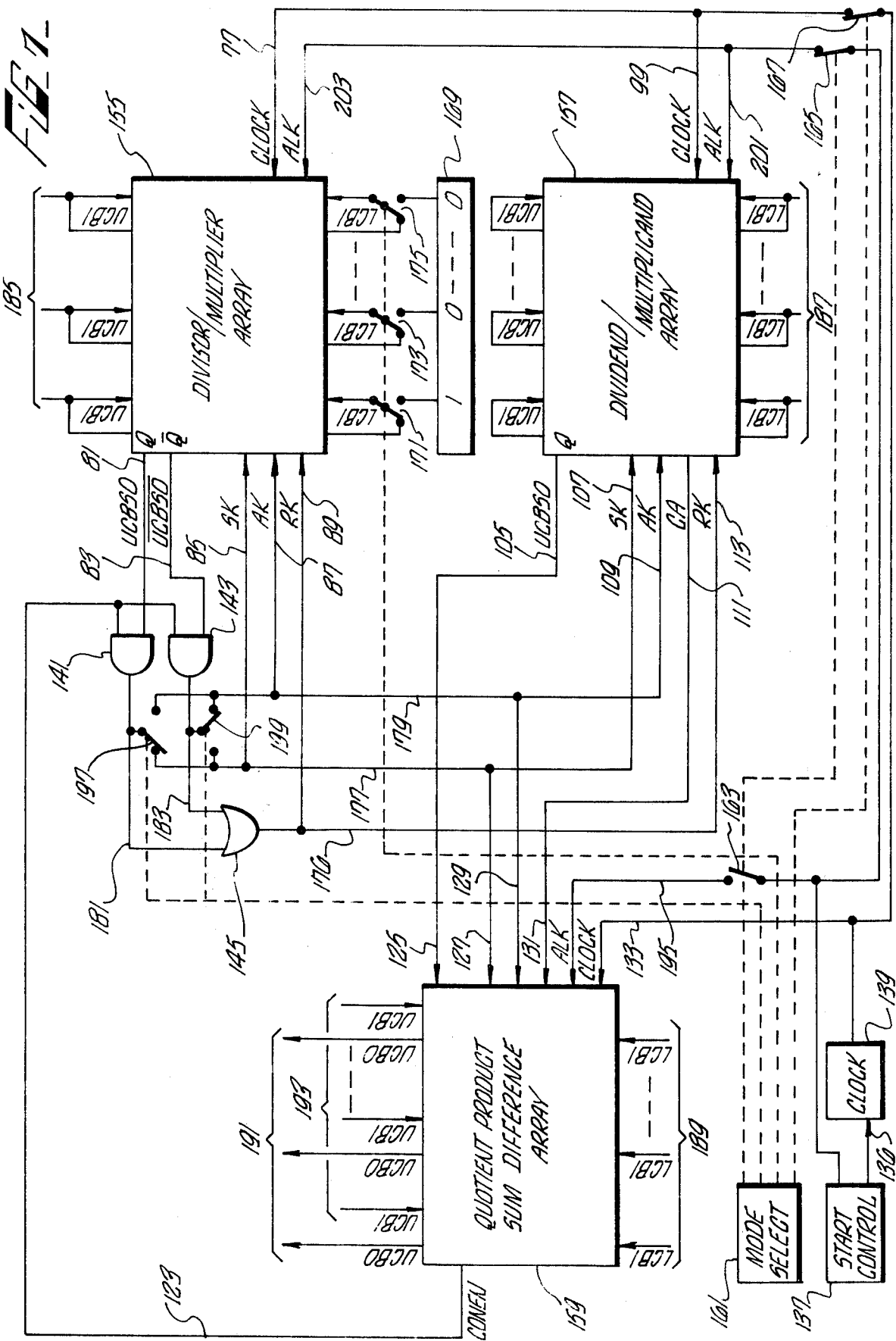

| STEP | LALK ALK | SK | AK | RK | CONEN | CLOCK | MULTIPLIER ARRAY UPPER REGISTER CELLS / LOWER REGISTER CELLS | PRODUCT ARRAY UPPER REGISTER CELLS | MULTIPLICAND ARRAY UPPER REGISTER CELLS / LOWER REGISTER CELLS |
|---|---|---|---|---|---|---|---|---|---|
|  | 1 | 0 | 0 | 0 | 1 | 1 | 0 0 0 0 0 0 0 0 / 0 0 0 0 0 0 0 | 0 0 0 0 0 0 0 0 | 0 0 0 0 0 0 0 0 / 0 0 0 0 0 0 0 |
| 1 | 1 | 0 | 1 | 1 | 1 | 1 | 1 0 1 1 0 0 0 0 / 1 0 0 0 0 0 0 | 0 0 0 0 0 0 0 0 | 0 0 0 0 0 0 0 0 / 1 1 0 1 0 0 0 0 |
| 2 | 0 | 1 | 0 | 1 | 1 | 1 | 0 0 1 1 0 0 0 0 / 1 0 0 0 0 0 0 | 0 0 0 0 0 0 0 0 | 1 1 0 1 0 0 0 0 / 1 1 0 1 0 0 0 0 |
| 3 | 0 | 1 | 0 | 1 | 1 | 1 | 0 1 1 0 0 0 0 0 / 1 0 0 0 0 0 0 | 0 0 0 0 0 0 0 1 | 1 0 1 0 0 0 0 0 / 1 1 0 1 0 0 0 0 |
| 4 | 0 | 0 | 1 | 1 | 1 | 1 | 1 1 0 0 0 0 0 0 / 1 0 0 0 0 0 0 | 0 0 0 0 0 0 1 1 | 0 1 0 0 0 0 0 0 / 1 1 0 1 0 0 0 0 |
| 5 | 0 | 1 | 0 | 1 | 1 | 1 | 0 1 0 0 0 0 0 0 / 1 0 0 0 0 0 0 | 0 0 0 0 0 1 0 0 | 0 0 0 1 0 0 0 0 / 1 1 0 1 0 0 0 0 |
| 6 | 0 | 0 | 1 | 1 | 1 | 1 | 1 0 0 0 0 0 0 0 / 1 0 0 0 0 0 0 | 0 0 0 0 1 0 0 0 | 0 0 1 0 0 0 0 0 / 1 1 0 1 0 0 0 0 |
| 7 | 0 | 1 | 0 | 1 | 1 | 1 | 0 0 0 0 0 0 0 0 / 1 0 0 0 0 0 0 | 0 0 0 0 1 0 0 0 | 1 1 1 1 0 0 0 0 / 1 1 0 1 0 0 0 0 |
| 8 | 0 | 1 | 0 | 1 | 1 | 1 | 0 0 0 0 0 0 0 0 / 1 0 0 0 0 0 0 | 0 0 0 1 0 0 0 1 | 1 1 1 0 0 0 0 0 / 1 1 0 1 0 0 0 0 |
| 9 | 0 | 1 | 0 | 1 | 1 | 1 | 0 0 0 0 0 0 0 0 / 1 0 0 0 0 0 0 | 0 0 1 0 0 0 1 1 | 1 1 0 0 0 0 0 0 / 1 1 0 1 0 0 0 0 |
| 10 | 0 | 1 | 0 | 1 | 1 | 1 | 0 0 0 0 0 0 0 0 / 1 0 0 0 0 0 0 | 0 1 0 0 0 1 1 1 | 1 0 0 0 0 0 0 0 / 1 1 0 1 0 0 0 0 |
| 11 | 0 | 0 | 0 | 0 | 0 | 1 | 0 0 0 0 0 0 0 0 / 1 0 0 0 0 0 0 | 1 0 0 0 1 1 1 1 | 0 0 0 0 0 0 0 0 / 1 1 0 1 0 0 0 0 |
| 12 | 0 | 0 | 0 | 0 | 0 | 1 | 0 0 0 0 0 0 0 0 / 0 0 0 0 0 0 0 | 0 0 0 0 0 0 0 0 | 0 0 0 0 0 0 0 0 / 0 0 0 0 0 0 0 |

FIG_8_

MODULAR APPARATUS FOR BINARY QUOTIENT, BINARY PRODUCT, BINARY SUM AND BINARY DIFFERENCE GENERATION

This is a continuation of application Ser. No. 489,884, filed July 19, 1974, now abandoned.

CROSS-REFERENCE TO RELATED APPLICATIONS

This application is related to application Ser. No. 489,886 filed July 19, 1974, now abandoned in favor of Continuation application Ser. No. 639,516, filed Dec. 15, 1975 for Enhanced Apparatus for Binary Quotient, Binary Product, Binary Sum and Binary Difference Generation and to application Ser. No. 489,885 filed July 19, 1974, now abandoned in favor of continuation application Ser. No. 639,514, filed Dec. 15, 1975 for Modular Apparatus for Accelerated Generation of a Quotient of Two Binary Numbers.

BACKGROUND OF THE INVENTION

The present invention relates generally to improvements in binary arithmetic mechanisms and more particularly pertains to new and improved multiplication and division apparatus wherein the quotient of two binary numbers is formed by determining the reciprocal of the divisor and multiplying it by the dividend.

Those concerned with the development of binary arithmetic mechanisms have recognized the need for mechanisms that have redundant structure and are able to perform division as inexpensively and as fast as multiplication. Among the arithmetic operations which are most often implemented in digital computer hardware, division stands out as the most complex to control and costly to execute. For example, refer to: *Digital Systems: Hardware Organization and Design,* by F. J. Hill and G. R. Peterson, published by John Wylie and Sons, 1973, and *Design of a Computer - The Control Data* 6600, by J. E. Thornton, published by Scott-Foresman and Company, Glenview, Ill. 1970. These text books describe division as taking three to four times as long as multiplication.

With few exceptions, previously employed binary arithmetic algorithms have had strong decimal origins. Although conventional decimal approaches to addition, subtraction and multiplication are well adapted to binary machine implementation, the same cannot be said for "pencil and paper" decimal division nor for the Newton-Raphson iterative methods of division. Nevertheless, almost all previously implemented binary division procedures derive from decimal procedures which fall into one or the other of these two categories.

Binary division procedures which do not have strong decimal origins have been reported, for example, by Huei Ling in U.S. Pat. No. 3,633,018, Hugh N. Sierra in U.S. Pat. No. 3,648,038, Goldschmidt and Powers in U.S. Pat. No. 3,508,038 and by W. Scott Bennett in U.S. Pat. No. 3,777,132. The division procedures described in the above patents have one or more relative disadvantages. For example, the method of Goldschmidt and Powers requires a table reference to initiate it and several multiplications to complete it. All the division apparatus described in the above recited publications utilize rather complex non-modular hardware that in each case is largely unique to the division process.

SUMMARY OF THE INVENTION

An object of this invention is to provide a high speed divider mechanism for binary numbers.

Another object is to provide a divider mechanism for binary numbers that has highly redundant structure.

A further object of this invention is to provide a structurally redundant arithmetic mechanism for binary numbers that performs division and multiplication, most significant bit first.

Yet another object is to provide an arithmetic mechanism for binary numbers that utilizes modular construction and performs division and multiplication, most significant bit first.

These objects and the general purpose of this invention are attained by utilizing a module as the basic building block for the arithmetic mechanism. The modules are conected into three arrays. Each array, by itself, can add and subtract. To multiply and divide, a first array is a divisor or multiplier array, a second array is a dividend or multiplicand array, and a third array is a quotient or product array.

To perform division, the divisor array manipulates the divisor in order to obtain an add and shift sequence that will generate a binary approximation of one. This, effectively produces the reciprocal of the divisor. The divisor is manipulated ost significant bit first. As each shift or add step is obtained, it is utilized to manipulate the dividend accordingly, thereby generating the quotient, most significant bit first. The manipulation of the dividend, according to the shift and add sequence obtained by the divisor array, is effectively the same as multiplying the dividend by the reciprocal of the divisor, most significant bit first.

To perform multiplication, the multiplier array evolves the particular add and shift sequence to be utilized on the multiplicand in the multiplicand array for generating the product, most significant bit first.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like reference numerals designate like parts throughout the figures thereof and wherein:

FIG. 4 illustrates in block diagram form the interconnection of modules to form a quotient array;

FIG. 5 illustrates in block diagram and logic circuit form the interconnection of a divisor, a dividend and a quotient array to provide an apparatus for performing binary division according to the present invention;

FIG. 6 is an illustration of the states of the apparatus of FIG. 5 during the solution of a specific division problem;

FIG. 7 is an illustration in block diagram and logic circuit form of the interconnection of three like arrays to perform either division, multiplication, subtraction or addition;

FIG. 8 is an illustration of the states of the apparatus of FIG. 7 during the generation of a solution for a specific multiplication example.

DESCRIPTION OF THE PREFERRED EMBODIMENTS

Figure 1:
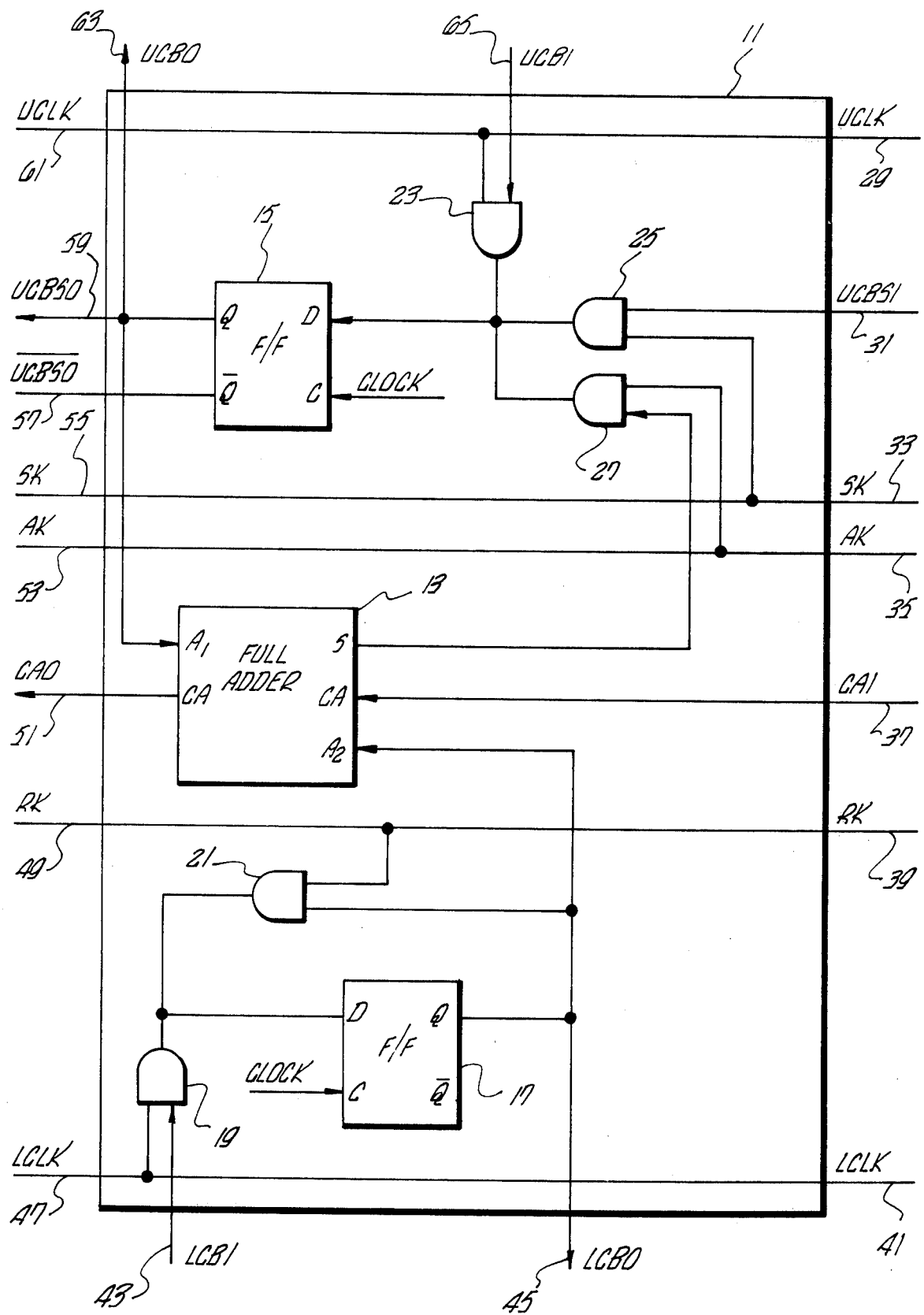
FIG. 1 shows a logic circuit diagram for a module that is utilized redundantly in the present invention.

Before describing the specific embodiments of the invention, perhaps a discussion of the theoretical bases of the invention will provide a better comprehension of the invention and its specific embodiments.

The present invention is an extension of and an improvement over the invention described in U.S. Pat. No. 3,777,132. The theoretical discussion in that patent should, therefore, be referred to for an explanation of some of the basic theorems upon which the following theoretical discussion will build.

Conceptually, this invention is concerned with a method of performing division that is uniquely well suited to binary machine implementation. This method is comparable to simple binary multiplication, both in speed of execution and in simplicity of control. It consists of performing the same steps as those used in binary multiplication, with the given dividend as the multiplicand and the reciprocal of the given divisor as the multiplier, except that the order of manipulation starts with the most significant bit of the multiplicand and multiplier.

Consider first the general case of any positive binary number, $d = d_o 2^{E_d}$ in which $\frac{1}{2} \leq d_o - 1$ and $E_d$ is an integer. The reciprocal of $d_o$ can be found to any desired precision by performing a successive approximation based upon the $$S_n = \sum_{i=o}^{i=n} 2^{-k_i}$$

$k_o = 0$ and for all $n > O$, $k_n$ is the smallest positive integer such that $d_o S_n < 1$. In other words, $S_n$ will approach $d_o^{-1}$ as $n$ becomes very large. Thus if $d$ denotes a given divisor and $D = D_o 2^{E_D}$ denotes a given dividend where $\frac{1}{2} \leq D_o \leq 1$ and $E_D$ is an integer, then the quotient $Dd^{-1}$ can be found by successive approximation based upon the equation $$D_o S_n = D_o \sum_{i=o}^{i=n} 2^{-k_i}$$

and the subtraction $E_D - E_d$. That is, as $n$ becomes very large, if $S_n$ approaches $d_o^{-1}$, then $D_o S_n$ approaches $D_o d_o^{-1}$.

Consider now a specific example of the multiplication procedure used by this invention. A multiplicand 13, which in binary form is 1101, will be multiplied by a multiplier 11, which in binary form is 1011, to yield an answer of 143, or 10001111. Instead of proceeding in the order from the least significant to the most significant digit of the multiplier to manipulate the multiplicand, the present invention proceeds in the order of most significant to least significant digit of the multiplier to manipulate the multiplicand. The long-hand multiplication in such a sequence is illustrated below.

```
     1101
     1011
     ----
     1101
    01101
     1101
   --------
   10001111
```

The machine sequence for the same multiplication can be illustrated in the following manner:

|  |  |  |
|---|---|---|
| 1101 | 1. | Add D × 1 |
| 0000 |  | Shift |
| 11010 |  | Add D × 0 |
| 1101 |  | Shift |
| 1000001 | 2. | Add D × 1 |
| 1101 |  | Shift |
| 10001111 | 3. | Add D × 1 |

As can be seen from the machine sequence example, the first bit of the answer is not generated immediately, due to possible carry propagation. However, the second add step produces four bits of accuracy, while the third add step produces eight bits of accuracy.

Consider now the division of two binary numbers for the specific example of 33 divided by 11. The binary long-hand division procedure for these two numbers would be as follows:

```
              11
       ----------
   1011 ) 100001
          1011
          ----
           1011
           1011
           ----
              0
```

The answer, of course, is three. The same result for this particular divisor and dividend can be obtained by forming the reciprocal of the divisor 1011 and multiplying it by the dividend.

The binary reciprocal of the divisor 1011 for the first 10 most significant bits is shown to be as illustrated below:

```
   1
  ---- = .0001011101
  1011
         1011
      .0001011101
         1011       1
         1011       Shift
         1011       0
         1011
        -------
        110111      1
        110111      Shift
         1011
        -------
       1111001      1
       1111001      Shift
         1011
       --------
      11111101      1
      11111101      Shift
      11111101      0
         1011
      ---------
      .1111111111   1
```

Multiplying the reciprocal of the number with the number itself, of course, will yield unity which is approximated by the 10 binary ones to the right of the decimal point.

From the above, it can be seen that any shift and add sequence that manipulates the divisor in such a way as to produce a plurality of binary ones which continue to increase after successive shift and add steps, represents the reciprocal of that binary number being manipulated. This is true even though the particular shift and add sequence utilized is different from the shift and add sequence dictated by the actual reciprocal. The following illustrated shift and add sequence produces a product that is 10 bits of binary ones long:

|         |       |   | Steps |
|---------|-------|---|-------|
|         | 01011 | A | 1     |
|         | 01011 |   |       |
|         | 10110 | A | 2     |
| 1       | 0110  | S | 3     |
|         | 01011 |   |       |
| 1       | 10111 | A | 4     |
| 11      | 0111  | S | 5     |
|         | 01011 |   |       |
| 11      | 11001 | A | 6     |
| 111     | 1001  | S | 7     |
| 1111    | 001   | S | 8     |
|         | 01011 |   |       |
| 1111    | 11010 | A | 9     |
|         | 01011 |   |       |
| 1111    | 11010 | A | 10    |
| 11111   | 1010  | S | 11    |
| 111111  | 010   | S | 12    |
|         | 01011 |   |       |
| 111111  | 10011 | A | 13    |
| 1111111 | 0011  | S | 14    |
|         | 01011 |   |       |
| 1111111 | 10001 | A | 15    |
| 11111111| 0001  | S | 16    |
|         | 01011 |   |       |
| 11111111| 01101 | A | 17    |
|         | 01011 |   |       |
| 11111111| 11000 | A | 18    |

As can be seen from this example, the shift and add sequence utilized is quite different from the shift and add sequence dictated by the actual reciprocal of the divisor. The product, a sequence of binary ones, however, is the same. It follows, therefore, that utilizing the same shift and add sequence to manipulate the dividend will produce a product that is a quotient since, in effect, the dividend is being multiplied by the reciprocal of the divisor. An actual example of this will be discussed hereinafter.

The actual hardware utilized to manipulate the divisor for forming a shift and add sequence that generates a plurality of binary ones for a product and utilizes that shift and add sequence as it is being formed to manipulate the dividend for generating a quotient, will now be discussed with reference to the drawings.

Referring first to FIG. 1, a single module 11, which is the basic building block for the arithmetic mechanism of this invention, is shown as comprising the basic elements of a full adder 13 and 2 one bit storage elements 15 and 17. The storage elements 15 and 17 are D-type flip-flops.

The upper one bit storage element 15 receives signals from one of three sources. The upper flip-flop 15 can store a bit being loaded from the outside over Upper Cell Bit In (UCBI) line 65, or a bit being received from a less significant adjacent module over Upper Cell Bit Shift In (UCBSI) line 31, or the Sum (S) output of the full adder 13. When Upper Cell Load Control (UCLK) line 29-61 is high, the UCBI bit on line 65 is loaded into flip-flop 15 through AND Gate 23. When Shift Control (SK) line 33-55 is high, the UCBSI bit on line 31 is loaded into the D flip-flop 15 through AND Gate 25. When the Add Control (AK) line 35-53 is high, the S output of full adder 13 is loaded into the D flip-flop 15 through AND Gate 27. The Q output of the D flip-flop 15 is supplied to a First Add ($A_1$) input of the full adder 13 and to the outside over Upper Cell Bit Out (UCBO) line 63 as well as to the next most significant adjacent module over Upper Cell Bit Shift Out (UCBSO) line 59. The Q output of the D flip-flop 15 is made available over the UCBSO line 57.

The lower one bit storage element, D-type flip-flop 17, is loaded from the outside over Lower Cell Bit In (LCBI) line 43 or from its Q output. When the Lower Cell Load Control (LCLK) line 41-47 is high, the LCBI bit on line 43 is loaded into the D flip-flop 17 through AND Gate 19. When the Restore Control (RK) line 39-49 is high, the previous state of D flip-flop 17 is restored by supplying its Q output back to its input through AND Gate 21. The Q output of D flip-flop 17 is also supplied to the outside over Lower Cell Bit Out (LCBO) line 45 and to a Second Add input ($A_2$) of the full adder 13.

In addition to the two inputs from the upper and lower storage elements, the full adder 13 receives a carry input on Carry Input (CAI) line 37 from a less significant adjacent module and, when appropriate, generates a carry output on Carry Output (CAO) line 51.

The module as illustrated in FIG. 1 is connected in cascade with a plurality of like modules to form three structurally alike arrays. If it is desired to utilize the three array combination as a divider mechanism, one array would be utilized as the divisor array, another array would be utilized as the dividend array and the third array would be utilized as the quotient array.

Figure 2:
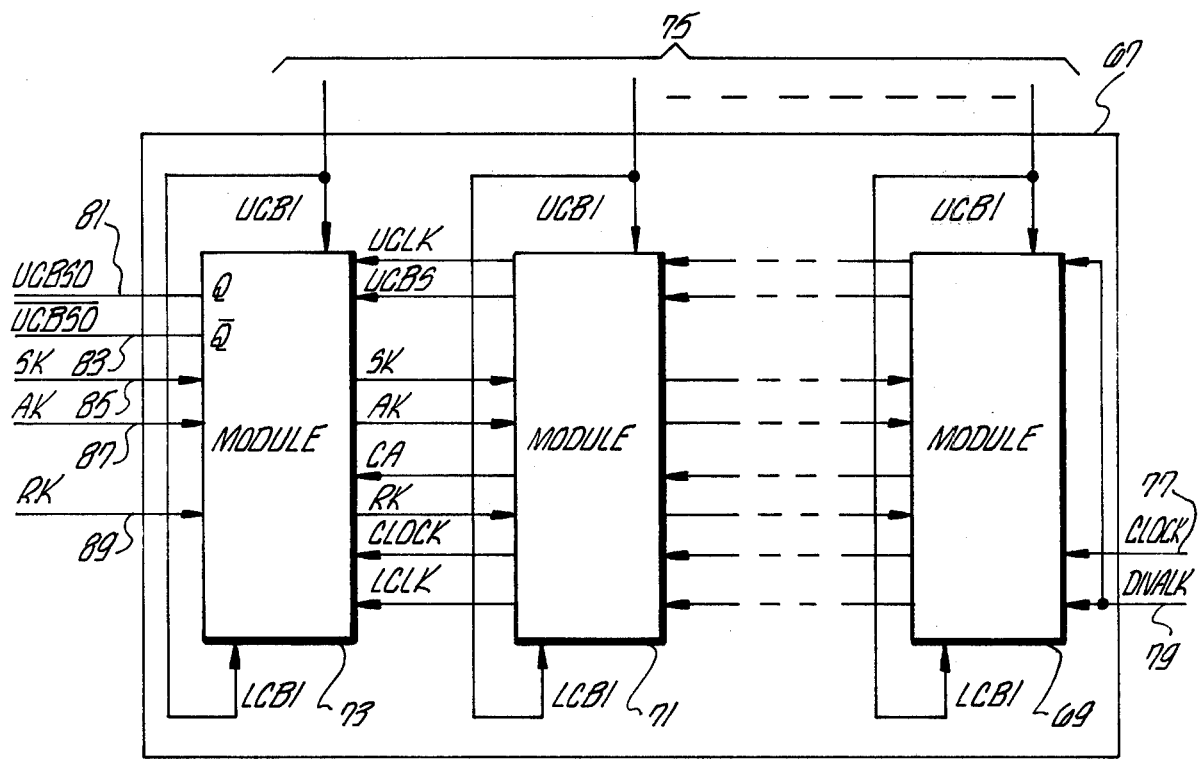
FIG. 2 illustrates in block diagram form the interconnection of a plurality of modules to form a divisor array.

Referring now to FIG. 2, the interconnection of modules to form a divisor array 67 is illustrated. A plurality of modules 69, 71, 73, the number of modules used being equal to or greater than the number of bits in the divisor received over the input lines 75, are connected in cascade. The divisor array 67 receives a clock signal on clock line 77, a divisor array load control signal on Divisor Array Load Control (DIVALK) line 79 and a divisor over lines 75. Since the UCBI and LCBI lines of each module are connected together, and the DIVALK line is connected to the UCLK and LCLK lines of each module, the divisor is loaded into the upper cell and lower cell registers at the same time. The upper flip-flops of the modules form the upper cell register. The lower flip-flops of the modules form the lower cell register. The left-most module 73 of the array may be considered to be the most significant module, following Western convention. The Q output of the upper D-type flip-flop of the most significant module 73 is made available over a UCBSO line 81. The Q output of the same flip-flop is made available over the UCBSO line 83. Shift control, add control and restore control signals over lines 85, 87 and 89, respectively, are received from control logic circuitry that will be described hereinafter.

Figure 3:
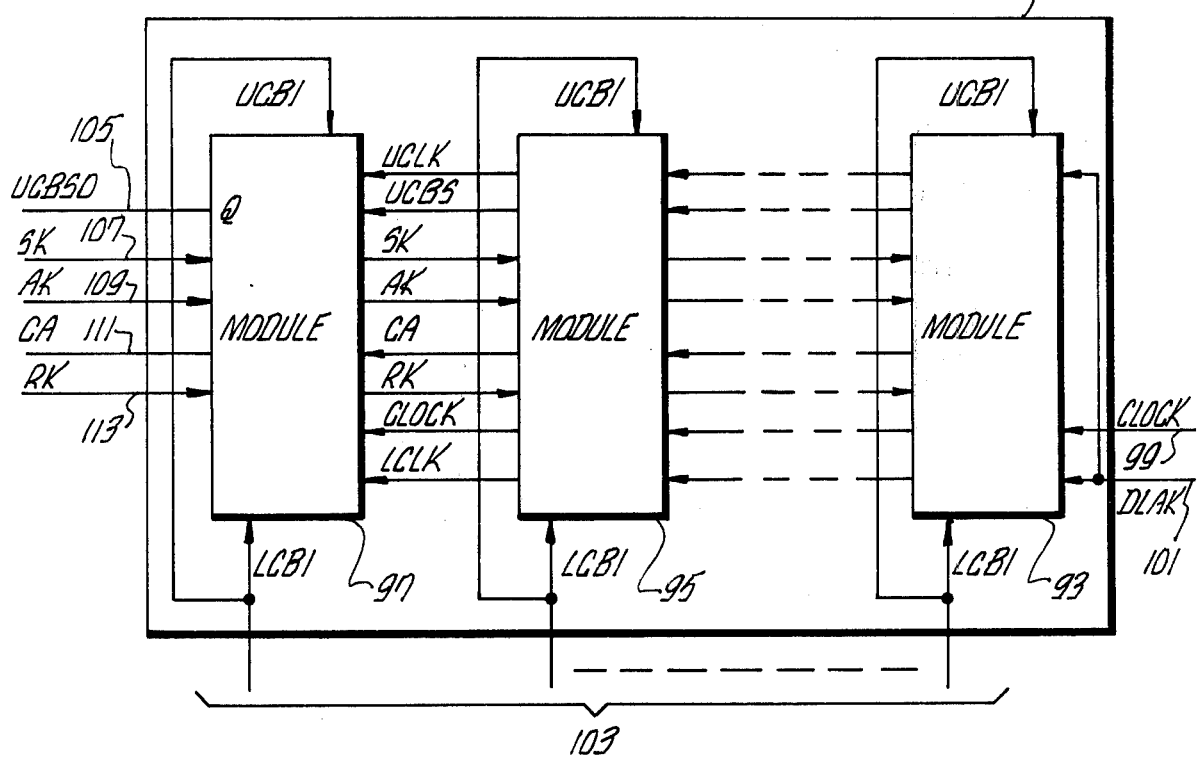
FIG. 3 illustrates in block diagram form the interconnection of a plurality of modules to form a dividend array.

Referring now to FIG. 3, a dividend array 91 is shown as comprising a plurality of like modules 93, 95, 97, connected in cascade, the number of modules being at least equal to the number of bits in the dividend being received over input line 103. The LCBI and the UCBI lines of each module are connected together so that the dividend is loaded into the upper and lower cell bit registers of the dividend array 91 at the same time. The dividend array receives a clocking signal over clock line 99 and a dividend array load control signal over Dividend Array Load Control (DALK) line 101. The most significant module 97 in the array 91, supplies the Q output of the upper flip-flop of that module over UCBSO line 105 and a carry signal from the full adder of that module over CA line 111. The shift control, add control and restore control signals over lines 107, 109 and 113, respectively, are received from the same control logic circuitry that generates these signals for the divisor array.

Referring now to FIG. 4, the quotient array 115 is shown as comprising a plurality of like structured modules, 117, 118, 119 connected in cascade, the number of modules equaling the bit accuracy desired in the quotient. The generated quotient is received at output lines 121. The most significant module 119 of the quotient array 115 generates a control enable signal on Control Enable (CONEN) line 123 which emanates from the Q output of the upper flip-flop in that module. The quotient array receives shift control, add control and clock signals over lines 127, 129 and 133 respectively. The least significant module 117 in the quotient array receives bits shifted in over UCBSI line 125 and carry input signals over CA1 line 131.

Referring now to FIG. 5, a divider mechanism is shown as consisting of three like arrays connected together with a control logic circuit. For the purposes of example, it will be assumed that the length or number of modules in each array are equal. That is, the number of modules in the divisor array equals the number of modules in the dividend array which equals the number of modules in the quotient array. The divisor array 67 receives the divisor over lines 75 at the same time that a dividend is supplied over lines 103 to the dividend array 91. Once the divisor and dividend are loaded into their respective arrays, the apparatus is self-propagating. The start control circuit 137 not only generates the divisor and dividend array load control signals but starts a master clock 139. The start control circuit 137 and clock 139 are seen as well within the purview of a person of ordinary skill in the art and will not be further described herein.

The length of the quotient array 115 determines the bit accuracy of the quotient generated at the output lines 121. As the dividend and divisor are loaded into their respective arrays, the CONEN signal on line 123 is high, thereby enabling AND Gates 143 and 141 to pass the binary bits being generated at the Q and $\bar{Q}$ outputs of the upper flip-flop in the most significant module of the divisor array over lines 81 and 83, respectively. Whenever the UCBSO line 81 is high, AND Gate 141 generates a shift control signal (SS) over line 147 that is supplied to the SK line 85 of the divisor array, the SK line 107 of the dividend array and the SK line 127 of the quotient array. Whenever the UCBSO line 81 is low, line 83 is high, causing an add control signal (AS) to be generated by AND Gate 143 over line 149. This add control signal is supplied to the AK line 85 of the divisor array, to the AK line 109 of the dividend array, and to the AK line 129 of the quotient array. The occurrence of either a shift control signal, over line 147, or an add control signal, over line 149, will cause OR Gate 145 to generate a restore control signal on line 151 that is supplied to the RK line 89 of the divisor array, and to the RK line 113 of the dividend array.

The Q output of the upper flip-flop in the most significant module of the dividend array is supplied over UCBSO line 105 to the least significant module in the quotient array over line 125. The carry output, on CA line 111, of the divided array is supplied to the carry input 129 of the least significant module in the quotient array. The quotient array 115 also receives a clock signal over clock input line 133.

A binary counter 135, having a modulo that is one bit less than the bit length of the quotient array 115, is advanced a count every time the Q output of the upper flip-flop in the most significant module of the divisor array is high. The binary counter is reset by the CONEN signal on line 123 going low which occurs when the quotient in the quotient array 115 is generated to the bit accuracy desired. The operation of this counter in conjunction with the various arrays will be explained hereinafter in connection with a specific division example.

Before the divisor and the dividend are loaded into their respective arrays in FIG. 5, they are conformed into a floating binary point format. That is, the divisor mantissa or dividend mantissa ranges between $\frac{1}{2}$ and as close to 1 as the array widths allow or, in binary form .1000 . . . 0 and .1111 . . . 1. Appropriate 2's power exponents are stored in respective exponent registers, to be manipulated after the quotient is formed. These exponents determine the placing of the binary point. If the divisor mantissa and dividend mantissa can range between $\frac{1}{2}$ and 1, the resultant quotient mantissa will range between $\frac{1}{2}$ and 2. That is, between .1000 . . . 0 and 1.1111 . . . 1.

The binary couner 135 of FIG. 5 is utilized to determine when the quotient mantissa is greater than 1, as will be explained hereinafter. Such a situation must be detected in order for the binary point of the quotient to be correctly placed. The registers and control logic for manipulating the divisor, dividend and quotient, after it is generated, in the standard floating binary point format, is seen as being well within the purview of a person of ordinary skill in the art and will not be described herein. U.S. Pat. No. 3,777,132 issued to W. Scott Bennett for a method and Apparatus for Obtaining the Reciprocal of a Number and the Quotient of Two numbers illustrates one type of exponent manipulation circuit that may be used with a floating binary point arithmetic mechanism.

Referring now to FIG. 6, the states of the various modules in the divisor, dividend and quotient arrays in the dividing mechanism of FIG. 5 are illustrated for a specific division example. The control signals generated by the control circuit of FIG. 5 are also illustrated. The example illustrates the division of 33 by 11 yielding an answer that approximates 3. The example of FIG. 6 illustrates the divisor, quotient and dividend arrays as being 6 bits long, thereby yielding a quotient mantissa that is acurate to 6 bits. The binary point in each of the arrays can be thought of as being physically placed to the left of the most significant module in that array. To simplify the discussion hereinafter, the divisor mantissa, dividend mantissa and quotient mantissa will only be referred to as the divisor, dividend, and quotient.

The first step consists of loading the divisor array and dividend array with their respective divisor and dividend. In this instance, the dividend is .100001 × $2^6$ and the divisor is .01011 × $2^5$. The divisor and dividend are loaded into the upper and lower cell registers of their respective arrays at the same time. The divisor is always loaded in the divisor array so that the most significant module in the divisor array is loaded with a binary 0 in its upper and lower flip-flop. The divisor must be loaded in this manner in order for the apparatus of this invention to generate a shift and add sequence that will produce a plurality of binary ones as a product.

Upon the divisor and dividend being loaded in their respective arrays, their states are as shown at step 1 of FIG. 6. The control circuit (FIG. 5) in response thereto will generate an add signal, causing the upper and lower registers of the divisor array and the dividend array to be added together, the sum being placed in the upper cell register of each with the contents of the lower cell register being restored to its original state, that is, to the value of the divisor and dividend as loaded. The result of such an operation is shown in the divisor and dividend array at step 2. As can be seen, the result of adding the dividend to itself caused the propagation of a bit into the quotient array. This is the most significant bit of the partial quotient. In response to the new contents of the upper cell register in the divisor array, the control circuit will now generate a shift signal, causing the contents of the upper cell register to be shifted to the left by one bit in the divisor array and the dividend array. The result of such an operation is seen at step 3, which shows the partial quotient to an accuracy of two bits. The shift and add sequence is evolved in such a manner, depending upon the binary value of the output of the upper flip-flop in the most significant module of the divisor array. This continues until step 11 when the most significant bit of the quotient reaches the most significant module in the quotient array, causing the control enable signal on line 123 to go low, thereby disabling the control circuit of the divisor mechanism (FIG. 5) and resetting the binary counter 135. The contents of the quotient array at this point is 101111.

All that remains to be done is the placement of the binary point. According to the exponent notation noted at the time of loading of the divisor and dividend array, the divisor was multiplied by $2^5$ and the dividend was multiplied by $2^6$. Subtracting these two leaves a 2's power exponent of $2^1$ for the quotient. This would move the binary point to the right one bit position. In this particular example, however, the quotient falls between 1 and 2. This is detected by the binary counter 135, since it has a modulo that is one less than the bit length of the quotient array. Consequently, the binary counter will be reset before it can generate an output on line 153. This occurs because the number of binary ones generated on line 81 by the divisor array has a bit count that is one less than the bit length of the quotient array at the time that the desired accuracy of the quotient is achieved. When the quotient happens to fall between 1 and 2, the number of binary ones generated on line 81 by the divisor array will be one less than the bit length of the quotient array at the time the desired accuracy of the quotient is attained. Therefore, the modulo of the binary counter 135 will not be exceeded before the most significant bit in the quotient array reaches the last module in the quotient array. Thus, whenever the quotient falls between 1 and 2, the binary counter does not produce a high signal level on line 153, thereby triggering circuitry, that is considered to be well known in the art and will not be herein described, to move the binary point of the quotient one more position to the right. Whenever the quotient falls between $\frac{1}{2}$ and 1, a binary high is generated by the counter 135 on line 153, thereby preventing the movement of the binary point one more position to the right. The answer of the specific division example, therefore, is 10.1111 which is an approximation of three to a bit accuracy of six.

Referring now to FIG. 7, an arithmetic mechanism that can divide, multiply, add, and substract is illustrated. The basic array combination for a divider mechanism as illustrated in FIG. 5 is slightly modified to provide the function of multiplication, addition and subtraction.

The multiplier mechanism of FIG. 7 will be discussed first. A mode select circuit 161, which is considered to be well within the purview of a person of ordinary skill in the art to construct, selects the mode of operation for the mechanism to be either division, multiplication, addition or subtraction. If the multiplication mode is selected by means of, for example, a manual rotary switch, the switches 197–199 in the control signal generating circuit are moved from their normal positions, as shown, so that the output of AND Gate 141 is supplied to line 179 and the output of AND Gate 143 is supplied to line 177. Also, the switches 171, 173 and 175 are moved from their normal resting position, as shown, to contact the output lines of register 169. The other switches 163, 165 and 167 remain in the positions illustrated. Thus conditioned, the combination of the three arrays, 155, 157 and 159, will perform multiplication. Array 155 may be thought of as the multiplier array, array 157 may be thought of as the multiplicand array and array 159 may be thought of as the product array.

The multiplier is loaded into the multiplier array 155 over input lines 185. At the same time, a binary one is loaded into the lower flip-flop of the most significant module in the multiplier array from register 169. The multiplicand is loaded into the multiplicand array 157 over input lines 187. The multiplicand is only loaded into the lower register cells of the multiplicand array 157. Once the multiplier and multiplicand are loaded, the apparatus of 157 is self-propagating and generates the product most significant bit first.

Referring now to FIG. 8, a specific multiplication example has been chosen to illustrate the function of the multiplication mechanism of FIG. 7. The multiplicand 13 has been chosen to be multiplied by 11 giving an answer of 143. In binary form, 1101 is being multiplied by 1011. The answer should be 10001111 to an accuracy of eight binary positions. In this example, that is the length of the multiplier, multiplicand and product array. The multiplier and multiplicand are received by the multiplying mechanism in floating binary point form. That is, the binary point can be thought of as being physically located immediately to the left of the most significant module in the multiplier, multiplicand and product arrays. Peripheral equipment, such as exponent registers, would be utilized to store the correct 2's power of the multiplier and multiplicand arrays. Logic circuitry (not shown) would combine these 2's powers to provide the correct exponent for the product when obtained.

Referring to step 1 in FIG. 8, it can be seen that the multiplier array is loaded with the multiplier in the upper cell register and is loaded with a binary one in the most significant module of the lower cell register. The multiplicand array, meanwhile, is loaded with the multiplicand in the lower cell register of the multiplicand array. The second step is an add function since the most significant bit of the multiplier is a binary one indicating an add function is to be performed. The third step is a shift since the most significant bit of the multiplier is a zero. The fourth step is also a shift since the most significant bit of the multiplier is again a zero. The fith step is an add. The sixth step is a shift. The seventh step is an add, and so on until the eleventh step, which is a shift step, to produce the product 10001111 in the product array, causing the product array to generate a control enable signal on line 123 to disable AND Gates 141 and 143. Floating binary point mechanisms not shown and considered to be well within the purview of a person of ordinary skill in the art would place the binary point in the product array to the right of the last digit generated since summation of $2^4$ and $2^4$ is $2^8$, thereby moving the binary point eight places to the right. This, of course, is the correct answer, 143.

From the control signals of the state diagram of FIG. 8, it can be seen that the restoration of the binary one in the lower flip-flop of the most significant module in the multiplier array after each shift and add step functions to provide a shift after each addition step.

Referring now to the meachanism of FIG. 7 as an add or subtract mechanism, the mode select circuit 161 would actuate switches 163, 165 and 167, causing 163 to close and 165 and 167 to open. Array 159 would then function as a sum or difference array depending upon what was loaded into the array. It should be understood that arrrays 157 and 155 could also be set up to function identically as array 159 with regard to addition and subtraction if it was so desired. For purposes of example, however, only array 159 is shown as adapted for the addition and subtraction function. In the case of addition, the minuend would be submitted to the sum array 159 over input lines 189. The addend would be submitted to the sum array over input lines 193. They would be loaded into the array when the array load control signal on line 195 is high. After being loaded, the sum would be presented at the output lines 191.

In the case of subtraction, the augend would be made available to the difference array 159 at input lines 189. The subtrahend would be made available to the difference array 159 at input lines 193. The augend and subtrahend would have to be presented in 2's complement form in order for the full adder in the difference array 159 to produce a difference on the output lines 191. Apparatus for taking the 2's complement of a subtrahend and augend are seen as well within the purview of a person of ordinary skill in the art and will not be herein described. If the utilization of 2's complementing circuitry is not desired, a full adder-subtracter circuit could be substituted for the full adder. Such circuitry is well known in the art. The operating mode would be selected by the mode select circuit 161 in the same manner that it selects the states of the various switches above described.

In summary, a modular arithmetic mechanism has been described. This modular arithmetic mechanism provides a high speed divider mechanism for binary numbers that has highly redundant or modular structure. In addition to a divider mechanism, it provides a multiplication mechanism that also has highly redundant structure and generates the product most significant bit first. It should be understood, of course, the foregoing disclosure relates only to preferred embodiments of the invention in that numerous modifications may be made therein without departing from the spirit and the scope of the invention as set forth in the appended claims.

What is claimed is:

1. A high-speed divider for binary numbers, comprising:
   a divisor array comprising a plurality of like structured modules;
   a dividend array comprising a plurality of like structured modules, like the modules in said divisor array;
   a quotient array comprising a plurality of like structured modules, like the modules in said divisor array and said dividend array; and
   control means, responsive to the divisor array, for generating signals indicative of manipulative control steps for said divisor array, said dividend array, and said quotient array.

2. The high-speed divider of claim 1, wherein said divisor array comprises a serial array of like modules, the number of modules being at least one greater than the number of bit positions in the divisor.

3. The high-speed divider of claim 2 wherein each module in said serial array of modules, comprises:
   an upper one bit storage element;
   a lower one bit storage element; and
   a full adder connected to and receiving a first input from said upper storage element, a second input from said lower storage element, and a carry input from a less significant module, said adder supplying the sum of the first and second inputs and the carry input, if present, to the upper storage element, and supplying a carry output, if generated, to the next most significant module in the array.

4. The high-speed divider of claim 3 wherein said control means responds to output signals from the most significant module to generate a shift signal if the full adder in the most significant module would generate a carry if an addition were performed, said control means generating an add signal if the full adder in the most significant module would not generate a carry if an addition were performed.

5. The high-speed divider of claim 2 including means for loading said divisor into said divisor array so that the most significant bit of the divisor is loaded into the next to most significant module in the divisor array.

6. The high-speed divider of claim 5 wherein said means for loading loads said divisor into said divisor array so that the divisor is right justified with the binary point occurring to the left of the most significant 1 in the divisor.

7. The high-speed divider of claim 6 wherein said control means includes a binary counter connected to the output of the most significant module in said divisor array, said counter having a modulo equal to the number of modules in said quotient array, minus one.

8. A divider for dividing a dividend digital pattern by a divisor digital pattern to form a quotient digital pattern, comprising:
   first means for receiving a divisor digital pattern;
   said first means including means for manipulating a received divisor digital pattern so as to produce control signals representative of the multiplication of the received divisor digital pattern by its reciprocal;
   second means for receiving a dividend digital pattern; and
   means for applying said control signals produced by said first means to said second means;
   said second means including means responsive to said control signals for manipulating a received dividend in accordance with said control signals so as to produce output signals representative of said quotient digital pattern.

9. The invention in accordance with claim 8, wherein said divisor, dividend and quotient digital patterns are each binary digit patterns, and wherein said control signals produced by said first means comprise add and shift signals.

10. The invention in accordance with claim 9, wherein said first and second means each includes a serial array of like structured modules.

11. The invention in accordance with claim 10, wherein each said module comprises:

an upper one bit storage element;

a lower one bit storage element; and a full adder receiving a first input from said upper storage element, a second input from said lower storage element and a carry input from a less significant module, said adder supplying the sum of the first input, second input and the carry input, if present, to said upper storage element, and supplying a carry output, if generated, to the next most significant module in a said serial array.

12. The invention in accordance with claim 11, including means for loading the divisor into the array of said first means so that the most significant digit of the divisor is loaded into the next to most significant module thereof.

13. The invention in accordance with claim 12, wherein said means for manipulating includes means responsive to output signals produced from the most significant module during manipulation of said divisor for generating a shift signal if the full adder in said most significant module would generate a carry if an addition were performed, and to generate an add signal if the full adder in the most significant module would not generate a carry if an addition were performed.

14. An arithmetic mechanism for binary numbers, comprising:

a first array comprising a plurality of like structured modules;

a second array comprising a plurality of like structured modules, like the modules in said first array;

a third array comprising a plurality of like structured modules, like the modules in said first array and said second array; and control means, responsive to the first array, for selectively generating first or second sets of control signals indicative of manipulative control steps occurring in said first array;

said control means including means for selecting between generation of said first and second sets of control signals for application to said first, second and third arrays.

15. The invention in accordance with claim 14, wherein said first array of like structured modules comprises a serial array of modules.

16. The invention in accordance with claim 15, including means for loading a first plurality of binary digits into said serial array of modules so that the most significant bit is loaded into the next to most significant module in said serial array.

17. The arithmetic mechanism for binary numbers of claim 15 wherein each module in said serial array of modules comprises:

an upper one bit storage element;

a lower one bit storage element; and a full adder receiving a first input from said upper storage element, a second input from said lower storage element, and a carry input from a less significant module, said adder supplying the sum of the first input, second input and the carry input, if present, to the upper storage element, and supplying a carry output, if generated, to the next most significant module in said serial array.

18. The arithmetic mechanism for binary numbers of claim 17 wherein said control means is constructed and arranged so that when generating said first set of control signals, it responds to output signals from the most significant module in said first array to generate a shift signal if the full adder in the most significant module would generate a carry if an addition were performed and to generate an add signal if the full adder in the most significant module would not generate a carry if an addition were performed.

19. The invention in accordance with claim 17, wherein said control means further includes means for placing and maintaining a binary one in the lower one bit storage element in the most significant module in said serial array when said control means is generating said second set of control signals.

20. The invention in accordance with claim 14, including means for loading at least one of said first, second and third arrays with an augend-addend pair for producing the sum thereof.

21. The invention in accordacne with claim 14, including means for loading at least one of said first, second and third arrays with a minuend-subtrahend pair for producing the difference thereof.

* * * * *

UNITED STATES PATENT AND TRADEMARK OFFICE
CERTIFICATE OF CORRECTION

PATENT NO. : 4,047,011

DATED : September 6, 1977

INVENTOR(S) : Walter Scott Bennett

It is certified that error appears in the above-identified patent and that said Letters Patent are hereby corrected as shown below:

Col. 2, line 18, change "conected" to —connected—;
line 27, change "ost" to —most—.

Col. 3, line 29, change "$½ \leq d_o - 1$" to —$½ \leq d_o < 1$—;
line 32, after "the" insert —equation—;
line 36, at beginning of line insert —where—;
line 40, change "$½ \leq D_o \leq 1$" to —$½ \leq D_o \leq 1$—.

Col. 5, line 12, change "11010" to —01111—;
line 65, change "Q" to —$\overline{Q}$—;
line 66, change "UCBSO" to —$\overline{UCBSO}$—.

Col. 6, line 44, change "Q" to —$\overline{Q}$—;
line 45, change "UCBSO" to —$\overline{UCBSO}$—.

Col. 7, line 8, change "Q" to —$\overline{Q}$—;
line 38, change "Q", second occurrence, to —$\overline{Q}$—;
line 60, change "divided" to —dividend—.

Col. 8, line 17, change "ween" to —tween—;
line 30, change "method" to —Method—;
line 31, change "num-" to —Num—;
line 44, change "acurate" to —accurate—.

UNITED STATES PATENT AND TRADEMARK OFFICE
CERTIFICATE OF CORRECTION

PATENT NO. : 4,047,011

DATED : September 6, 1977

INVENTOR(S) : Walter Scott Bennett

It is certified that error appears in the above-identified patent and that said Letters Patent are hereby corrected as shown below:

(Continued)

Col. 10, line 58, change "fith" to --fifth--.
Col. 11, line 8, change "meachanism" to --mechanism--.
Col. 14, line 42, change "accordacne" to --accordance--.

Signed and Sealed this

Thirteenth Day of December 1977

[SEAL]

Attest:

RUTH C. MASON
Attesting Officer

LUTRELLE F. PARKER
Acting Commissioner of Patents and Trademarks